US011274725B2

(12) United States Patent
Zehnder, II et al.

(10) Patent No.: US 11,274,725 B2
(45) Date of Patent: Mar. 15, 2022

(54) MR MOUNT APPARATUS USING A POLYMERIC SHEET DECOUPLER

(71) Applicant: BeijingWest Industries Co., Ltd., Beijing (CN)

(72) Inventors: James William Zehnder, II, Tipp City, OH (US); Michael William Hurtt, Waynesville, OH (US); Scott D. McCoy, Miamisburg, OH (US); Timothy Michael Schlangen, Kettering, OH (US); David John Barta, Beavercreek, OH (US)

(73) Assignee: BEIJINGWEST INDUSTRIES CO., LTD, Beijing (CN)

( * ) Notice: Subject to any disclaimer, the term of this patent is extended or adjusted under 35 U.S.C. 154(b) by 289 days.

(21) Appl. No.: 16/537,623

(22) Filed: Aug. 12, 2019

(65) Prior Publication Data

US 2020/0080614 A1    Mar. 12, 2020

Related U.S. Application Data

(60) Provisional application No. 62/729,344, filed on Sep. 10, 2018.

(30) Foreign Application Priority Data

Jul. 10, 2019   (CN) .......................... 201910619268.6

(51) Int. Cl.
*F16F 13/10* (2006.01)
*F16F 9/53* (2006.01)
(Continued)

(52) U.S. Cl.
CPC ................ *F16F 9/53* (2013.01); *B62D 21/11* (2013.01); *B62D 29/048* (2013.01); *F16F 9/10* (2013.01)

(58) Field of Classification Search
CPC ...... F16F 9/10; F16F 9/105; F16F 9/53; F16F 13/102; F16F 13/105; F16F 13/106
(Continued)

(56) References Cited

U.S. PATENT DOCUMENTS

| 4,531,484 A | 7/1985 | Kimura et al. |
| 4,932,636 A * | 6/1990 | Phillips ................ F16F 13/105 267/140.13 |

(Continued)

FOREIGN PATENT DOCUMENTS

| CN | 201944188 U | 8/2011 |
| CN | 102705426 A | 10/2012 |

(Continued)

OTHER PUBLICATIONS

First Office Action and search report dated Sep. 11, 2020 for counterpart Chinese patent application No. 201910619268.6, along with machine EN translation downloaded from EPO.

(Continued)

*Primary Examiner* — Thomas W Irvin
(74) *Attorney, Agent, or Firm* — William H. Honaker; Dickinson Wright PLLC

(57) ABSTRACT

A hydraulic mount apparatus includes a housing having an upper portion and a lower portion disposed on a center axis and defining a housing chamber. A partition member is disposed in the housing chamber dividing the housing chamber into a pumping chamber and a receiving chamber. The pumping chamber extends between the upper portion and the partition member. The receiving chamber extends between the lower portion and the partition member. A decoupler is attached to the partition member separating the pumping chamber and the receiving chamber. A moving member is disposed in the pumping chamber and attached to the decoupler. The moving member is made from a non- (Continued)

elastomeric polymer sheet secured to the decoupler for providing the additional damping force.

19 Claims, 3 Drawing Sheets

(51) Int. Cl.
    *B62D 29/04*     (2006.01)
    *B62D 21/11*     (2006.01)
    *F16F 9/10*     (2006.01)

(58) Field of Classification Search
    USPC .................................... 267/140.11, 140.14
    See application file for complete search history.

(56) References Cited

U.S. PATENT DOCUMENTS

| | | | | |
|---|---|---|---|---|
| 5,246,211 | A * | 9/1993 | Klein | F16F 13/105 |
| | | | | 267/140.13 |
| 5,263,693 | A * | 11/1993 | Klein | F16F 13/105 |
| | | | | 267/140.13 |
| 5,571,263 | A * | 11/1996 | Koester | F16F 13/10 |
| | | | | 267/140.13 |
| 5,769,402 | A | 6/1998 | Ide et al. | |
| 6,082,718 | A | 7/2000 | Yamada et al. | |
| 6,126,153 | A | 10/2000 | Hein et al. | |
| 6,361,031 | B1 | 3/2002 | Shores et al. | |
| 6,439,556 | B1 * | 8/2002 | Baudendistel | F16F 13/106 |
| | | | | 267/140.15 |
| 7,810,797 | B2 | 10/2010 | Minamisawa | |
| 8,672,105 | B2 | 3/2014 | Kim | |
| 9,022,368 | B2 * | 5/2015 | Marienfeld | F16F 13/10 |
| | | | | 267/140.14 |
| 9,051,989 | B2 * | 6/2015 | Schumann | F16F 9/537 |
| 9,322,451 | B2 * | 4/2016 | Schumann | F16F 13/264 |
| 10,125,842 | B2 * | 11/2018 | McDonough | B60K 5/1283 |
| 2002/0109280 | A1 * | 8/2002 | Baudendistel | F16F 13/268 |
| | | | | 267/140.15 |
| 2009/0243171 | A1 * | 10/2009 | Nanno | F16F 13/107 |
| | | | | 267/140.13 |
| 2013/0154171 | A1 | 6/2013 | Nishi et al. | |
| 2014/0216869 | A1 * | 8/2014 | Schumann | F16F 9/537 |
| | | | | 188/267 |
| 2014/0217661 | A1 * | 8/2014 | Schumann | F16F 13/264 |
| | | | | 267/140.14 |
| 2016/0273609 | A1 * | 9/2016 | McDonough | F16F 13/10 |
| 2018/0187742 | A1 | 7/2018 | Fourman | |
| 2020/0080615 | A1 * | 3/2020 | Zehnder, II | B60K 5/1283 |

FOREIGN PATENT DOCUMENTS

| | | |
|---|---|---|
| CN | 105917136 A | 8/2016 |
| CN | 205745062 U | 11/2016 |
| CN | 107143596 A | 9/2017 |
| EP | 0556703 A1 | 8/1993 |
| EP | 1081409 A1 | 3/2001 |
| EP | 1099875 A1 | 5/2001 |
| FR | 2908488 B1 | 5/2008 |
| JP | 58118420 A | 7/1983 |
| JP | 2009103141 A | 5/2009 |

OTHER PUBLICATIONS

First Office Action issued for corresponding Japanese Patent Application 2019-162669 dated Sep. 23, 2020.

Extended European Search Report dated Jan. 23, 2020 for counterpart European patent application No. 19194247.3.

* cited by examiner

MR MOUNT APPARATUS USING A POLYMERIC SHEET DECOUPLER

CROSS-REFERENCE TO RELATED APPLICATIONS

This application claims priority to U.S. Provisional Patent Application Ser. No. 62/729,344, filed on Sep. 10, 2018, and China Patent Application No. 201910619268.6, filed Jul. 10, 2019, the entire disclosures of which are hereby incorporated herein by reference.

BACKGROUND OF THE INVENTION

1. Field of the Invention

The present invention generally relates to a hydraulic mount apparatus.

2. Description of the Prior Art

Conventional mounts exist for supporting and providing vibration isolation of vibration sources. One well-known application of these mounts is for supporting components of automotive vehicles. These mounts typically operate to provide engine vibration isolation while also to control the motion of the engine and connected powertrain components with respect to the vehicle frame or body structure. In many applications of engine and powertrain mounts, it is desirable to vary damping characteristics of the mount to provide selective isolation of vibrations at certain frequencies.

One such hydraulic mount apparatus is disclosed in U.S. Pat. No. 6,082,718. The hydraulic mount apparatus includes a housing having an upper portion and a lower portion disposed on a center axis and defining a housing chamber. A partition member is disposed in the housing chamber dividing the housing chamber into a pumping chamber and a receiving chamber. The pumping chamber extends between the upper portion and the partition member. The receiving chamber extends between the lower portion and the partition member. A decoupler is attached to the partition member separating the pumping chamber and the receiving chamber. A moving member of elastomeric material disposed in the pumping chamber attached to the decoupler.

Typically, metallic inserts are embedded in the moving member to allow a user to change the stiffness of the moving member. However, the inclusion of the metallic inserts in the moving members increases the manufacturing costs of the hydraulic mount apparatus. In addition, the elastomeric material and the metallic inserts can chemically react with the fluid in the hydraulic mount apparatus and, thus, reducing the life of the hydraulic mount apparatus.

SUMMARY OF THE INVENTION

The present invention provides a hydraulic damper that eliminates the need for metallic inserts in a moving member of a hydraulic mount apparatus. The present invention also prevents the moving member from extruding into the compression plate under positive pressure and into the cap under vacuum. The present invention further reduces the amount elastomeric material, e.g. rubber, in the moving member thereby improving the life of the hydraulic mount apparatus.

It is one aspect of the present invention to provide a hydraulic mount apparatus including a housing having an upper portion and a lower portion disposed on a center axis and defining a housing chamber. A partition member is disposed in the housing chamber dividing the housing chamber into a pumping chamber and a receiving chamber. The pumping chamber extends between the upper portion and the partition member. The receiving chamber extends between the lower portion and the partition member. A decoupler is attached to the partition member separating the pumping chamber and the receiving chamber. A moving member is disposed in the pumping chamber attached to the decoupler. The moving member is a non-elastomeric polymer sheet secured to the decoupler for providing the additional damping force.

It is another aspect of the present invention to provide a decoupler for a hydraulic mount apparatus. The decoupler includes a support member disposed on a center axis and extending between a support member upper end and a support member lower end. A moving member is disposed on the center axis, extending radially outwardly from the center axis to the support member upper end, and is attached to the support member upper end. The moving member is a non-elastomeric polymer sheet secured to the decoupler for providing the additional damping force.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
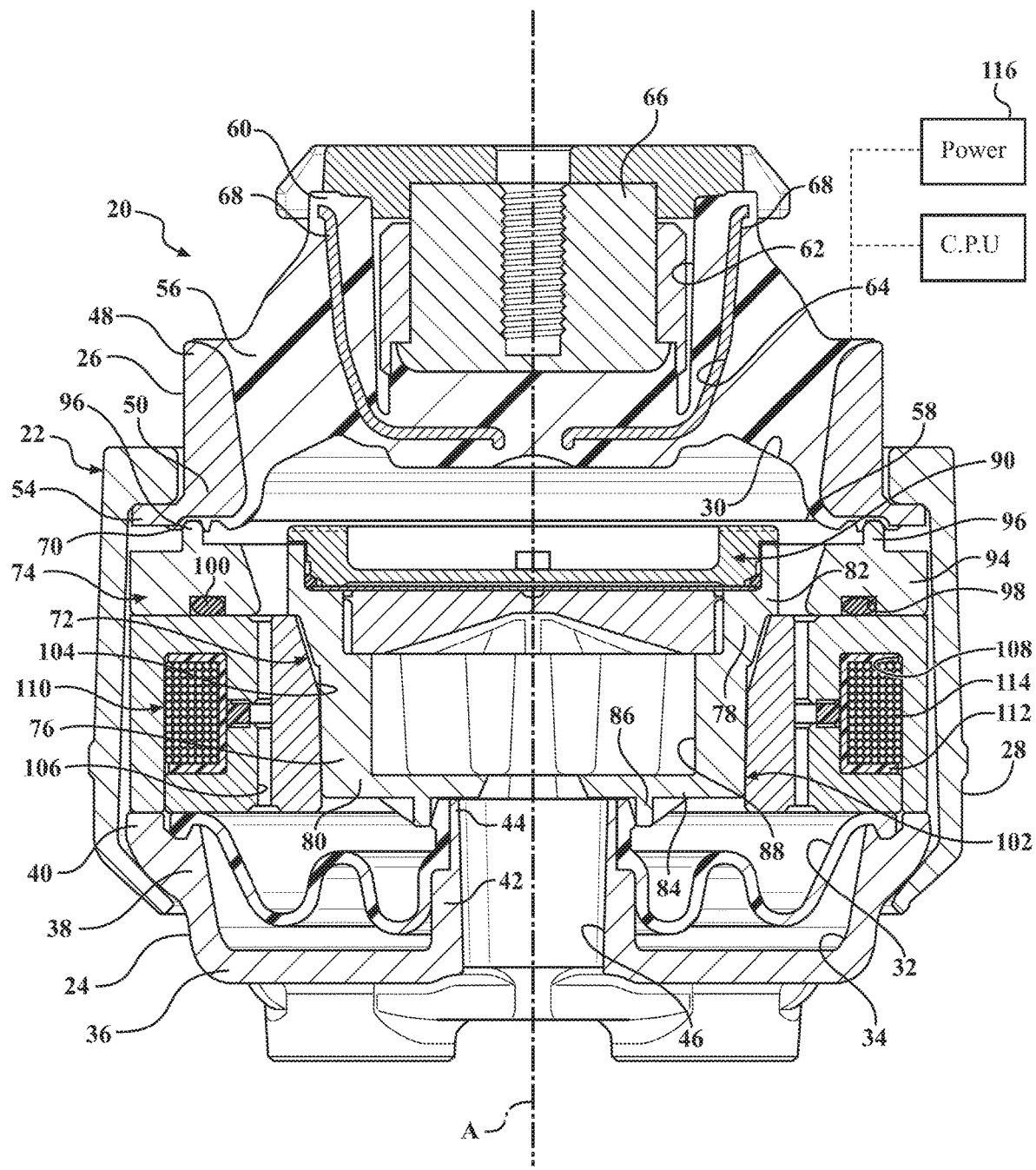
FIG. 1 is a cross-sectional view of the hydraulic mount apparatus in accordance with one embodiment of the present invention.

Referring to the Figures, wherein like numerals indicate corresponding parts throughout the several views, a hydraulic mount apparatus 20 constructed in accordance with one embodiment of the present invention is generally shown in FIG. 1. Typically, the hydraulic mount apparatus 20 is used for supporting a component of a vehicle, e.g. an engine, disposed on a frame of the vehicle. It should be appreciated that the hydraulic mount apparatus 20 can be used for supporting various other vibration sources.

As generally shown in FIG. 1, the hydraulic mount apparatus 20 includes a housing 22 having a lower portion 24 and an upper portion 26. The lower portion 24 and the upper portion 26 are disposed on a center axis A and axially spaced from one another. A wall 28, having a generally tubular shape, is disposed on the center axis A and extends between the lower portion 24 and the upper portion 26 to connect the lower portion 24 with the upper portion 26 and defining a housing chamber 30, 32, 34 extending between the lower portion 24, the upper portion 26, and the wall 28.

The lower portion 24, having a generally bowl shape, extends annularly about the center axis A between a lower portion closed end 36 and a lower portion opened end 38. A lower portion lip 40 extends radially outwardly from the lower portion opened end 38, perpendicular to the center axis A, to engage the wall 28. The lower portion 24 includes a collar 42, having a cylindrical shape, disposed on the center axis A. The collar 42 extends outwardly from the lower portion closed end 36 and annularly about the center axis A to a distal end 44. The collar 42 defines a lower portion bore 46, having a generally cylindrical shape, extending along the center axis A between the lower portion 24 and the distal end 44 for attaching the housing 22 to a vehicle.

The upper portion 26, having a generally tubular shape, is disposed on the center axis A and axially spaced from the lower portion 24. The upper portion 26 extends annularly about the center axis A between a first opened end 48 and a second opened end 50. The upper portion 26 defines an upper portion bore 52, having a generally cylindrical shape, extending along the center axis A between the first opened end 48 and the second opened end 50. The upper portion 26 includes an upper portion lip 54, disposed at the second opened end 50, and extends radially outwardly from the first opened end 48 in a perpendicular relationship with the center axis A to engage the wall 28. It should be appreciated that the upper portion 26 and the lower portion 24 can have other shapes (e.g. square shaped or hexagonal shaped cross sections).

A flexible body 56, made from elastomeric material, is disposed in the upper portion bore 52. The flexible body 56 extends annularly about and axially along the center axis A from a flexible body lower end 58 to a flexible body upper end 60. The flexible body lower end 58 is adjacent to the second opened end 50 of the upper portion 26. The flexible body upper end 60 is adjacent to the first opened end 48 of the upper portion 26 for deforming elastically relative to the lower portion 24 in response to an excitation movement of a vehicle. In other words, the flexible body 56 is attached to the upper portion 26 and deforms in response to an excitation movement of the vehicle, e.g. a vibrational movement. The flexible body 56 defines a flexible chamber 62 disposed adjacent to the flexible body upper end 60 extending axially into the flexible body 56 from the flexible body upper end 60. The flexible body 56 further defines a pair of insert grooves 64 disposed adjacent to and spaced from the flexible chamber 62 and extending between the flexible body lower end 58 and the flexible body upper end 60.

A bushing 66, having a generally cylindrical shape, is disposed in the flexible chamber 62 for receiving a fastener to secure the flexible body 56 to the vehicle. A pair of outer inserts 68, made from a metallic material, is disposed in the insert grooves 64 for providing rigidity to the flexible body 56. The flexible body 56 includes a flexible body flange 70 extending radially outwardly from the flexible body lower end 58, in a parallel relationship with the upper portion lip 54, for engagement with the upper portion lip 54 to secure the flexible body 56 to the upper portion 54.

A partition member 72 is disposed in the housing chamber 30, 32, 34, between the upper portion 26 and the lower portion 24, and extends annularly about the center axis A. The partitioning member 72 divides the housing chamber 30, 32, 34 into a pumping chamber 30 and a receiving chamber 32, 34. The pumping chamber 30 extends between the flexible body 56 and the partition member 72. The receiving chamber 32, 34 extends between the lower portion 24 and the partition member 72. In one embodiment of the present invention, a magnetorheological fluid can be contained in the pumping chamber 30 and the receiving chamber 32, 34. The magnetorheological fluid, as known in the art, is responsive to modify its shear properties. More specifically, in responsive to a magnetic field applied to the magnetorheological fluid, the magnetorheological fluid has the ability to modify its shear property from a free-flowing or a viscous liquid to a semi-solid with controllable yield strength.

Figure 2:
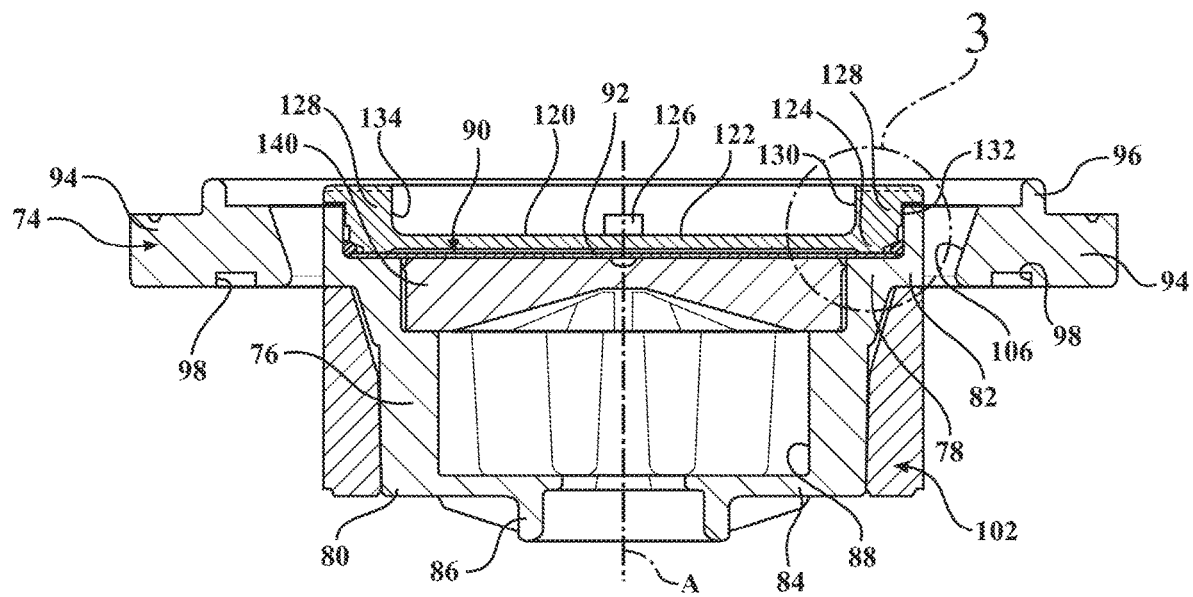
FIG. 2 is an enlarged cross-sectional fragmentary view of the decoupler of the hydraulic mount apparatus of FIG. 1.

As best shown in FIGS. 1 and 2, a decoupler 74 is disposed in the housing chamber 30, 32, 34 and attached to the partition member 72 to separate the pumping chamber 30 and the receiving chamber 32, 34 and to provide additional damping force in the pumping chamber 30. The decoupler 74 includes a support member 76, made from metal and having a generally tubular shape, attached to the partition member 72. The support member 76 extends annularly about and along the center axis A between a support member upper end 78 and a support member lower end 80. The support member upper end 78 is disposed in the pumping chamber 30. The support member lower end 80 is disposed in the receiving chamber 32, 34. A support member upper flange 82 extends radially outwardly from the support member upper end 78 and annularly about the center axis A to engage the partition member 72. A base 84, having a generally circular shape, is attached to the support member lower end 80 defining a recess 88, having a generally cylindrical shape, extending along the center axis A between the base 84, the support member upper end 78, and the support member lower end 80. A support member lower flange 86 extends outwardly from the base 84, along the center axis A, and annularly about the center axis A toward the lower portion to engage the distal end 44 of the collar 42.

The decoupler 74 includes a moving member 90, having a generally circular shape, disposed on the center axis A in the pumping chamber 30. The moving member 90 extends radially outwardly from the center axis A to the support member upper end 78. The decoupler 74 is attached to the support member upper end 78 separating the pumping chamber 30 from the receiving chamber 32, 34. A diaphragm 92, made from an elastomeric material, is disposed in the receiving chamber 32, 34. The diaphragm 92 extends annularly about the center axis A between the lower portion opened end 38 and the distal end 44 of the collar 42. The diaphragm 92 is sandwiched between the lower portion 24 and the partition member 72 and the support member lower flange 86 and the distal end 44 of the collar 42 dividing the receiving chamber into a fluid chamber 32 and a compensation chamber 34. The fluid chamber 32 extends between the diaphragm 92 and the partition member 72. The compensation chamber 34 extends between the lower portion 24 and the diaphragm 92.

The partition member 72 includes an upper spacer 94, made of metal and having a generally circular shape, disposed in the pumping chamber 30, axially adjacent to and below the upper portion 26, and in engagement with the flexible body flange 70 to sandwich the flexible body flange 70 between the upper portion 26 and the upper spacer 94. The upper spacer 94 includes at least one projection 96 extending outwardly from the upper spacer 94 to engage the flexible body flange 70 for securing the flexible body flange 70 between the upper portion 26 and the upper spacer 94. The upper spacer 94 defines at least one upper spacer groove 98, disposed opposite of the at least one projection 96 and axially spaced from the at least one projection 96, extending annularly about the center axis A along the upper spacer 94. A seal 100, made from an elastomeric material, is disposed in the upper spacer groove 98 and extends annularly about the center axis A.

The partition member 72 includes an electromagnetic support ring 102, having a generally circular shape disposed in said fluid chamber 32 between the upper spacer 94 and the lower portion 24. The electromagnetic support ring 102 extends annularly about the center axis A to sandwich the diaphragm 92 between the electromagnetic support ring 102 and the lower portion 24. The electromagnetic support ring 102 also sandwiches the seal 100 between the electromagnetic support ring 102 and the upper spacer 94. The electromagnetic support ring 102 defines a concavity 104, at least one channel 106, and an electromagnetic groove 108. The concavity 104, having a generally cylindrical shape, extends along the center axis A to receive the decoupler 74. The at least one channel 106, radially spaced from the concavity 104 and the decoupler 74, extends through the electromagnetic support ring 102 parallel to the center axis A to allow fluid communication between the pumping chamber 30 and the fluid chamber 32. The electromagnetic groove 108, disposed adjacent to the wall 28 and radially spaced from the at least one channel 106, extends annularly about the center axis A. An electromagnetic field generator 110 is disposed in the electromagnetic groove 108. The electromagnetic field generator 110 includes a bobbin 112, having a generally spool shape, disposed in the electromagnetic groove 108 and extending annularly about the center axis A. At least one coil 114 is annularly wrapped around the bobbin 112 and is electrically connected to a power source 116 for selectively generating a magnetic flux.

Figure 3:
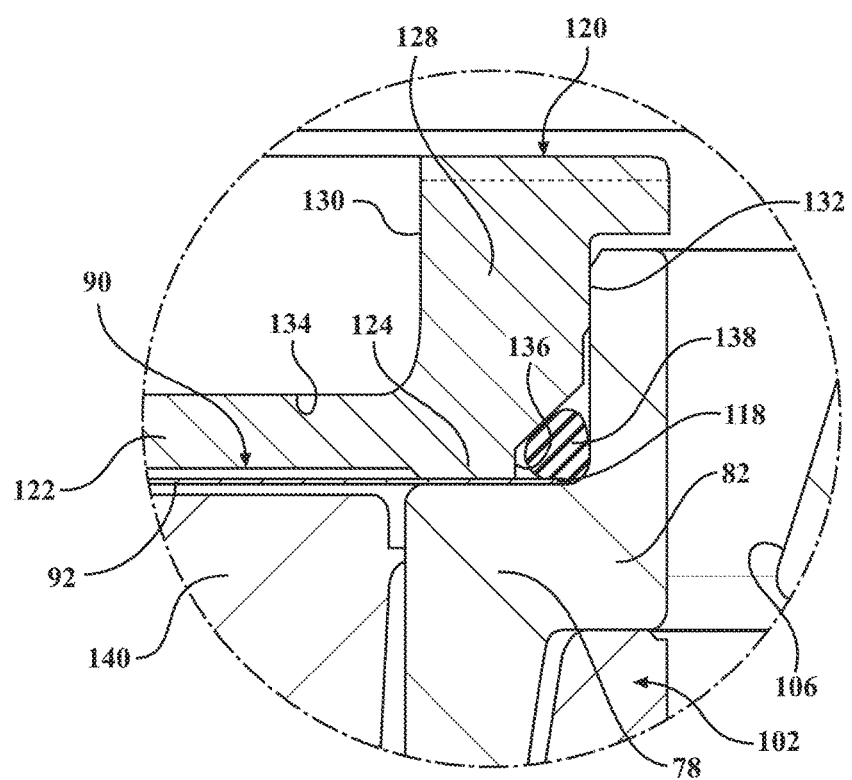
FIG. 3 is an enlarged cross-sectional fragmentary view of the decoupler of the hydraulic mount apparatus of FIG. 2.

As best shown in FIG. 3, the moving member 90 is a non-elastomeric polymer sheet secured to the decoupler 74 for providing the additional damping force. The moving member 90, having a generally circular shape, is a die cut polymer sheet and having an outer periphery 118 extending about the center axis A. With the moving member 90 being a non-elastomeric polymer, it also minimizes the chemical reaction between the moving member 90 and the magnetorheological fluid thereby prolonging the operation life of the decoupler 74 and the hydraulic mount apparatus 20.

More specifically, studies have shown that ethoxylated amines, propylene glycol and other additives contained in the magnetorheological fluid tend to reacts with the elastomeric material of the hydraulic mount apparatus 20. This chemical reaction generates gases in the hydraulic mount apparatus 20 that causes pressure buildup 20 thereby inhibiting the full functional performance of the hydraulic mount apparatus 20. In addition, the reaction also forms dimers and trimers in the magnetorheological fluid composition disrupting the thixotropic network formed in the magnetorheological fluid composition and causing the magnetic responsive particles to settle out of the magnetorheological fluid composition reducing the life of the magnetorheological fluid composition. With the moving member 90 being a non-elastomeric polymer, the present invention minimizes the chemical reaction between the moving member 90 and the magnetorheological fluid to prevent the magnetic responsive particles from settling out of the magnetorheological fluid and allow the decoupler 74 and the hydraulic mount apparatus 20 to operate over a longer period of time.

A cap 120, having a generally circular shape, is disposed in the pumping chamber 30, spaced from the decoupler 74, to secure the moving member 90 between the cap 120 and the decoupler 74. The cap 120 includes a lower plate 122, having a generally circular shape, disposed axially spaced from the moving member 90. A protrusion 124 extends outwardly from the lower plate 122 toward the decoupler 74 to engage the moving member 90 and secure the moving member 90 to the decoupler 74. It should be appreciated that the protrusion 124 can extend annularly about the center axis A to secure the moving member 90 to the decoupler 74. The lower plate 122 defines at least one orifice 126 extending through the cap 120 for allowing the magnetorheological fluid to flow through the cap 120. It should be appreciated that the at least one orifice 126 can include a plurality of orifices 126, radially and circumferentially spaced from one another, to allow the magnetorheological fluid to flow through the cap 120.

The cap 120 includes a rib 128 extending annularly outwardly from the lower plate 122 parallel to the center axis A in a direction opposite of the protrusion 124. The rib 128 has an inner surface 130 and an outer surface 132. The inner surface 120 of the rib 118 is facing the center axis A. The outer surface 132 of the rib 128 is disposed on an opposite side from the inner surface 130 and facing the wall 28. The cap 120 defines a pocket 134 disposed in fluid communication with the pumping chamber 30. The pocket 134 extends between the inner surface 130 of the rib 128 and the lower plate 122. The outer surface 132 is chamfered near the outer periphery 118 of the moving member 90 defining a conduit 136 extending annularly about the center axis A. An O-ring 138, made from elastomeric material, is disposed in the conduit 136 and extends annularly about the center axis A in sealing engagement with the outer surface 132 and the outer periphery 118 of the moving member 90. The decoupler includes a compression plate 140 disposed in the recess 88 adjacent and spaced from the moving member 90 on a side opposite of the cap 120 for limiting the movement of the moving member 90. In other words, the only rubber component in the decoupler is the O-ring 138, which provides a sealing function between the cap 120 and the moving member 90. In addition, it should be appreciated that the moving member 90, made from the non-elastomeric polymer, has a stiffness greater than rubber, which provides a low cost alternative to using an elastomeric moving member including metal inserts thereby limiting the need of the metallic inserts. Further, combination of the O-ring 138 and the cap 120 allows the moving member 90 to be properly secured to the decoupler 74 and resist the extrusion of the moving member 90 into the compression plate 140 under a positive pressure and into the cap 120 under vacuum.

Figure 4:
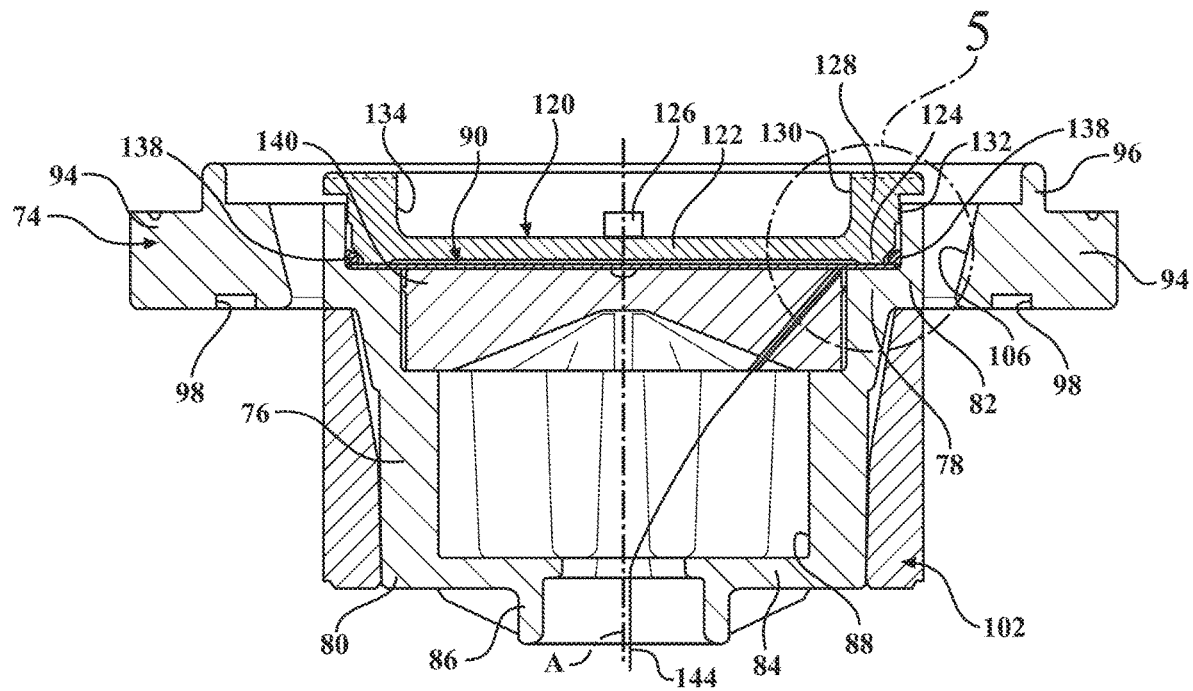
FIG. 4 is an enlarged cross-sectional fragmentary view of an alternative embodiment of the decoupler of the hydraulic mount apparatus.
Figure 5:
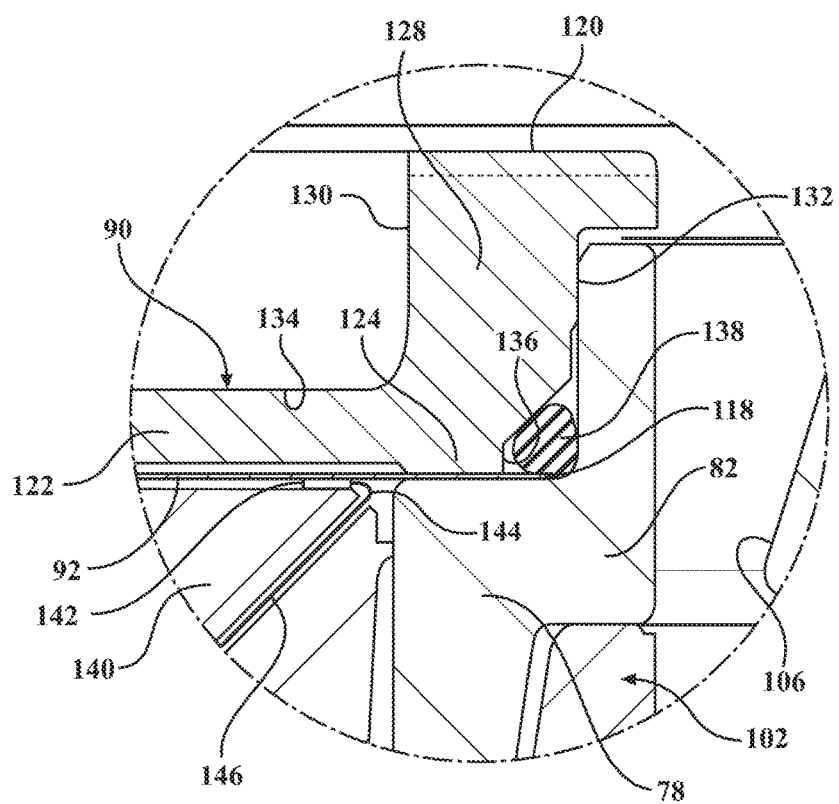
FIG. 5 is an enlarged cross-sectional fragmentary view of the decoupler of the hydraulic mount apparatus of FIG. 4.

FIGS. 4-5 provides an alternative embodiment of the decoupler 74 of the present invention. As illustrated in FIGS. 4-5, a strain gauge sensor 142 is disposed in the fluid chamber 32 and attached to the moving member 90 for measuring a load on the moving member 90 as a function of the movement of the moving member 90. A lead wire 144 is electrically connected to the strain gauge sensor 142 and extends through the compression plate 140. The lead wire 144 is also electrically connected to a processor for receiving and analyzing a signal received from the strain gauge sensor 142. In other words, the signal generated by the strain gauge sensor 142 allows a user to measure the frequency content of the moving member 90 of the decoupler 74. The compression plate 140 defines a passage 146 extending through the compression plate 140 for receiving the lead wire 144 to allow the lead wire 144 to extend through the decoupler 74. It should be appreciated that, instead of a lead wire 144, the strain gauge sensor 142 can include a wireless module that can transfer the signals of the stain gauge sensor 142 wirelessly to the user.

In operation, as the hydraulic mount apparatus 90 receives an excitation movement, e.g. a vibrational movement, the flexible body 56 deforms thereby causing a change in the volumes of the pumping chamber 30, the fluid chamber 32, and the compensation chamber 34. As a result, the moving member 90 flexes in the pumping chamber 30 in response to the volume change. As the moving member 90 flexes in the pumping chamber 30, the moving member 90 provides an additional damping force in the pump chamber 30 in response to the excitation movement. As the moving member 90 is flexing in the pumping chamber 30, the strain gauge sensor 142 records and monitors the moving member 90 and measure the load of the moving member 90 as a function of the movement of the moving member 90. The signal generated by the strain gauge sensor 142 is communicated via the lead wire 144 to a user, which allows the user to measure the frequency content of the moving member 90 of the decoupler 74.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A hydraulic mount apparatus comprising:
   a housing having an upper portion and a lower portion disposed on a center axis and defining a housing chamber;
   a partition member disposed in said housing chamber dividing said housing chamber into a pumping chamber and a receiving chamber with said pumping chamber being between said upper portion and said partition member and said receiving chamber being between said lower portion and said partition member;
   a decoupler attached to said partition member separating said pumping chamber and said receiving chamber; and
   a moving member disposed in said pumping chamber attached to said decoupler;
   wherein said moving member is a non-elastomeric polymer sheet secured to said decoupler for providing the additional damping force,
   wherein the hydraulic mount apparatus further includes a cap disposed in said pumping chamber space from said decoupler to secure said moving member between said cap and said decoupler,
   wherein said cap includes a lower plate disposed axially spaced from said moving member and a protrusion extending annularly outwardly from said lower plate toward said decoupler to engage said moving member and secure said moving member to said decoupler.

2. The hydraulic mount apparatus as set forth in claim 1 wherein said moving member is a die-cut polymer sheet having an outer periphery extending about said center axis.

3. The hydraulic mount apparatus as set forth in claim 2 wherein said cap includes a rib extending annularly outwardly from said lower plate and parallel to said center axis in a direction opposite of said protrusion with said rib having an inner surface facing said center axis and an outer surface opposite of said inner surface defining a pocket disposed in fluid communication with said pumping chamber between said inner surface and said lower plate.

4. The hydraulic mount apparatus as set forth in claim 3 wherein said outer surface of said rib is chamfered adjacent said outer periphery of said moving member to define a conduit extending annularly about said center axis.

5. The hydraulic mount apparatus as set forth in claim 4 further including an O-ring of elastomeric material disposed in said conduit and extending annularly about said center axis and in sealing engagement with said outer surface and said outer periphery of said moving member.

6. The hydraulic mount apparatus as set forth in claim 1 further including a strain gauge sensor disposed in said receiving chamber and attached to said moving member for measuring a load on said moving member in response to the movement of said moving member.

7. The hydraulic mount apparatus as set forth in claim 6 wherein said decoupler includes a compression plate disposed adjacent and spaced from said moving member on a side opposite of said cap for limiting the movement of said moving member.

8. The hydraulic mount apparatus as set forth in claim 7 further including a lead wire electrically connected to said strain gauge sensor and extends through said compression plate and electrically connected to a processor for receiving and analyzing a signal received from said strain gauge sensor.

9. The hydraulic mount apparatus as set forth in claim 8 wherein said compression plate defines a passage extending through said compression plate for receiving said lead wire to allow said lead wire to extend through said decoupler.

10. A decoupler for a hydraulic mount apparatus comprising:
    a support member disposed on a center axis and extending between a support member upper end and a support member lower end; and
    a moving member disposed on said center axis and extending radially outwardly from said center axis to said support member upper end and attached to said support member upper end;
    wherein said moving member is a non-elastomeric polymer sheet secured to said decoupler for providing the additional damping force,
    wherein the decoupler further includes a cap disposed in said pumping chamber spaced from said decoupler to secure said moving member between said cap and said support member,
    wherein said cap includes a lower plate disposed axially spaced from said moving member and a protrusion extending annularly outwardly from said lower plate toward said decoupler to engage said moving member and secure said moving member to said decoupler.

11. The decoupler as set forth in claim 10 wherein said moving member is a die-cut polymer sheet having an outer periphery extending about said center axis.

12. The decoupler as set forth in claim 11 wherein said cap includes a rib extending annularly outwardly from said lower plate and parallel to said center axis in a direction opposite of said protrusion with said rib having an inner surface facing said center axis and an outer surface opposite of said inner surface defining a pocket disposed in fluid communication with a pumping chamber between said inner surface and said lower plate.

13. The decoupler as set forth in claim 12 wherein said outer surface of said rib is chamfered adjacent said outer periphery of said moving member to define a conduit extending annularly about said center axis.

14. The decoupler as set forth in claim 13 further including an O-ring of elastomeric material disposed in said conduit and extending annularly about said center axis and in sealing engagement with said outer surface and said outer periphery of said moving member.

15. The decoupler as set forth in claim 10 further including a strain gauge sensor disposed in a receiving chamber and attached to said moving member for measuring a load on said moving member in response to the movement of said moving member.

16. The decoupler as set forth in claim 15 wherein said decoupler includes a compression plate disposed adjacent and spaced from said moving member for limiting the movement of said moving member.

17. The decoupler as set forth in claim 16 further including a lead wire electrically connected to said strain gauge sensor and extends through said compression plate and electrically connected to a processor for receiving and analyzing a signal received from said stain gauge sensor.

18. The decoupler as set forth in claim 17 wherein said compression plate defines a passage extending through said compression plate for receiving said lead wire to allow said lead wire to extend through said decoupler.

19. A hydraulic mount apparatus comprising:

a housing having an upper portion and a lower portion disposed on a center axis and defining a housing chamber;

a partition member disposed in said housing chamber dividing said housing chamber into a pumping chamber and a receiving chamber with said pumping chamber being between said upper portion and said partition member and said receiving chamber being between said lower portion and said partition member;

a decoupler attached to said partition member separating said pumping chamber and said receiving chamber; and a moving member disposed in said pumping chamber attached to said decoupler;

wherein said moving member is a non-elastomeric polymer sheet secured to said decoupler for providing the additional damping force, wherein the hydraulic mount apparatus further includes a strain gauge sensor disposed in said receiving chamber and attached to said moving member for measuring a load on said moving member in response to the movement of said moving member.

\* \* \* \* \*